No. 877,228. PATENTED JAN. 21, 1908.
J. S. TUTTLE.
BALING PRESS.
APPLICATION FILED JUNE 12, 1906.
2 SHEETS—SHEET 2.
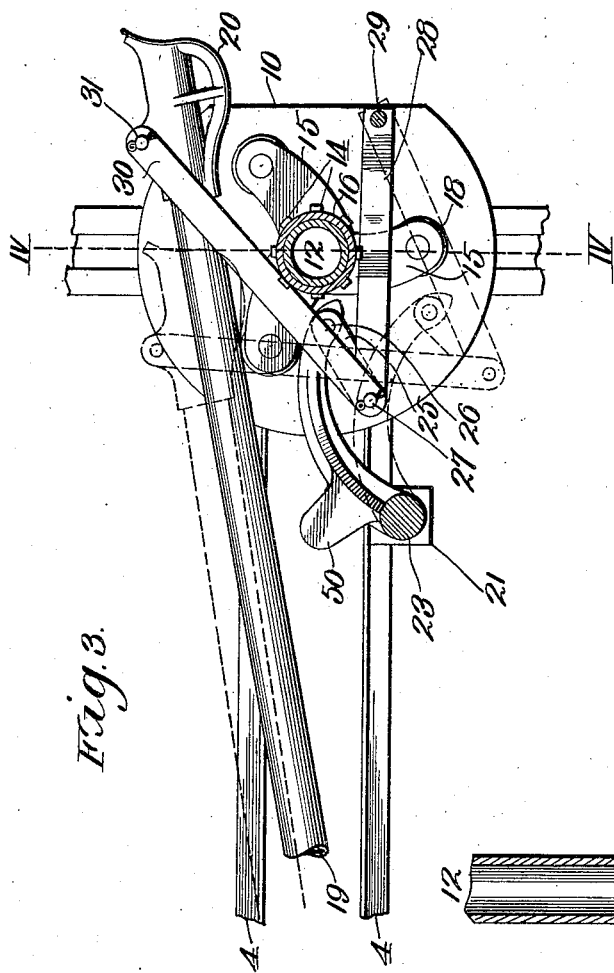
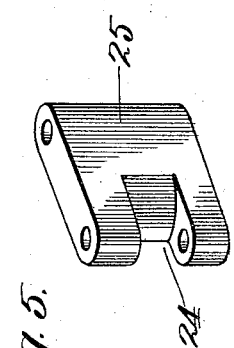
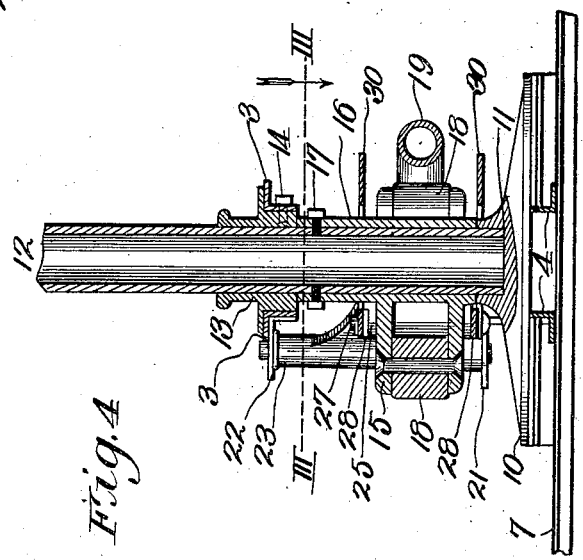
Witnesses
Frank R. Glore
H. C. Rodgers
Inventor
J. S. Tuttle
By George H. Thorpe
Atty

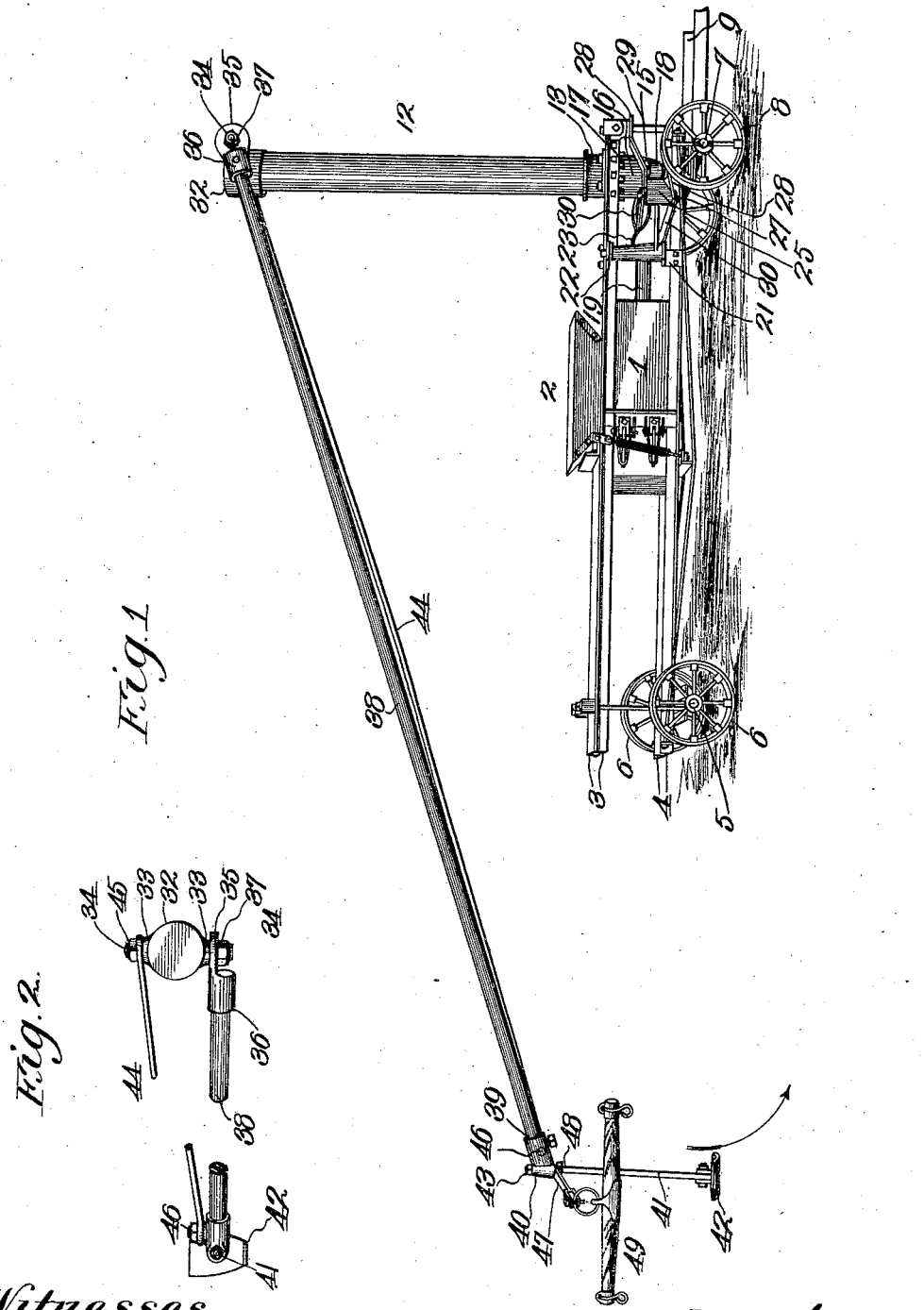

UNITED STATES PATENT OFFICE.

JOSIAH S. TUTTLE, OF KANSAS CITY, MISSOURI, ASSIGNOR TO THE OHIO CULTIVATOR COMPANY, OF BELLEVUE, OHIO, A CORPORATION OF OHIO.

BALING-PRESS.

No. 877,228.  Specification of Letters Patent.  Patented Jan. 21, 1908.

Application filed June 12, 1906. Serial No. 321,359.

*To all whom it may concern:*

Be it known that I, JOSIAH S. TUTTLE, a citizen of the United States, residing at Kansas City in the county of Jackson and State of Missouri, have invented certain new and useful Improvements in Baling-Presses, of which the following is a specification.

This invention relates to baling presses and has for its object the production of a machine which will operate efficiently and reliably and which is of simple, strong, durable and compact construction.

To this end the invention consists in certain novel and peculiar features of construction and organization as hereinafter described and claimed; and in order that it may be fully understood reference is to be had to the accompanying drawings, in which—

Figure 1, is a perspective view of a baling press embodying my invention. Fig. 2, is a top plan view, partly broken, away of the power shaft and the sweep. Fig. 3, is a horizontal section taken on the line III—III of Fig. 4. Fig. 4, is a vertical section taken on the line IV—IV of Fig. 3. Fig. 5, is a detail perspective view enlarged of a toggle link forming a part of the power mechanism.

In the said drawings, 1 indicates the baling case, 2 the hopper thereof, 3 longitudinal angle irons forming the upper corners of the baling case, and 4 longitudinal angle irons forming the lower corners of the baling case, said angle irons projecting forwardly and rearwardly from said case and constituting the framework of the press. 5 indicates the rear axle provided with wheels 6, at the rear end of the press, and 7 the front axle equipped with wheels 8 supporting the front end of the press, the front axle being provided with shafts 9 or any equivalent draft equipment to which a horse may be hitched to move the press from one point to another.

10 indicates a base plate of the type shown or of any other suitable or preferred type, secured in any suitable manner upon the front ends of the lower angle irons 4 and provided centrally with a socket 11, and 12 indicates the power shaft preferably tubular, journaled at its lower end in said socket and projecting a suitable distance above the press. 13 indicates a bearing secured to the upper angle irons 3 and forming a journal for said shaft, bolts 14 or equivalent means being utilized to secure said bearing to said angle irons. A trip lever, shown in this instance as provided with three equi-spaced trip arms 15, has its central portion or hub 16, fitting upon and secured rigidly to shaft 12 by means of bolts 17 and bears at its upper and lower ends against bearing 13 and base plate 10 to prevent upward or downward movement of the power shaft, the trip arms 15 being preferably equipped with anti-friction rollers 18 for engagement with the plunger-beam 19, the plunger, not shown being adapted to be connected to the plunger beam so as to reciprocate in the baling case, and 20 indicates the head of the plunger beam, for successive engagement by the anti-friction rollers 18 in a manner common in presses of this type.

21 indicates an angle bracket secured to and projecting laterally from the lower angle iron at the side of the power shaft opposite to that occupied by the head of the plunger beam and 22 a second angle bracket secured to the angle iron 3 above and journaled in said angle brackets is a curved arm or link 23, having its convex side disposed toward the plunger beam and occupying the same horizontal plane as said beam and the anti-friction rollers 18, said arm preferably tapering toward its free end and at such end fitting in the notch 24 in a link 25, a bolt or its equivalent 26 pivotally connecting said arm and link together. The arm and link constitute a swinging toggle.

27 indicates a pivot pin connecting the opposite end of said toggle link 25 to the rear ends of a pair of swing arms or links 28, said links engaging the upper and lower sides of the toggle link and having their opposite ends pivotally mounted on a pin or bolt 29 carried by the front ends of the same angle irons 3 and 4 that carry brackets 21 and 22. 30 indicates a pair of links pivotally connected at 31 to the head 20 above and below the same, said links 30 being also arranged above and below the trip lever arms, the toggle and the rear ends of links 28, and pivotally secured at their opposite ends upon the pin 27 pivotally uniting the toggle with said links 28.

32 indicates the sweep-head secured rigidly upon the upper end of power shaft 12, and provided with oppositely projecting arms 32 terminating in or equipped with bolt-ends 34 and pivotally mounted for movement in a vertical plane on one of said bolt ends is a casting 36, a nut 37 securing the same upon said bolt end and against the contiguous enlargement 33 thereof. 38 indicates the sweep preferably in the form of a long pipe pitched downward toward its free end and equipped at such end with a head 39, terminating in a vertical boss 40 through which extends a standard 41 provided at its lower end with a support to travel upon the ground, said support being preferably in the form of a pivoted runner 42, of such configuration as to ride over ordinary obstructions in its path, an enlargement or nut 43 at the upper end of standard 41 preventing disengagement between the head and standard.

44 indicates a truss rod secured at its upper end for vertical movement to the other bolt-end 34 of the sweep head and retained thereon by a nut 45, the opposite end of the truss rod being bolted as at 46 or otherwise rigidly secured to head 39.

47 indicates a draft bar pivoted on standard 41 and held adjacent to head 39 by a nut 48 or its equivalent on the standard, and connected to said draft bar or arm as shown or in any other suitable or preferred manner is a swingle tree 49, to which a draft animal is adapted to be hitched.

In practice the person feeding the press will stand at one side of the baling case for the purpose of depositing the hay or other material being baled in the hopper 2, it being understood that the power shaft 12 is of such height that the sweep will revolve around a foot or two above the feeder's head. The horse is caused to travel in the direction indicated by the arrow Fig. 1, and in each revolution one of the antifriction rollers 18 will engage the convex or trackway side of toggle arm 23, and force the latter outwardly. In the initial part of this action the roller will move a short distance toward the pivoted end of said arm and through the connecting links 28 and 30 result in expanding the toggle and thus effect the quick preliminary portion of the power stroke of the plunger beam, the succeeding trip lever roller bearing against the side of the head 20 to insure substantially direct reciprocatory movement of the beam. By the time the parts have assumed the positions shown in dotted lines Fig. 3, in which position it will be noted the toggle is materially expanded, said second or succeeding trip lever roller is about to roll into the pocket of the plunger beam and at the same time the preceding trip lever roller is still in engagement with the curved toggle arm but without any tendency to move said arm further outward materially, such engagement simply holding the plunger beam in proper position until said succeeding trip lever roller has properly entered the pocket and is imposing direct endwise thrust upon the plunger beam. After this relation is established there is no chance of disengagement between said parts until the plunger beam power stroke has been completed, that portion of the power stroke produced by the direct pressure of the beam on the trip lever being slow and powerful as is usual in presses of this character. Just before such second or succeeding trip lever roller has attained the position which the first trip lever roller occupies in Fig. 3, the side of the plunger beam comes into engagement with the trip-off lug 50 which preferably will be formed integral with the toggle arm 23, though not necessarily so, which trip off lug arrests the lateral movement of the plunger beam at such a point that when the trip lever roller rolls out of the pocket, the plunger beam shall recoil at the proper side of the power shaft, it being understood that the recoil of the power shaft may be effected by the usual retractile spring or any equivalent means, and it is to be likewise understood that any suitable shelf or support may be employed to take the weight of the plunger beam off the links 30 and parts connected thereto, the retractile spring or its equivalent and said shelf or support not being shown because in common use in this type of press. All succeeding operations are repetitions of those described.

By the use of the toggle link 25, a quick and long preliminary stroke of the plunger beam is effected with a comparatively short movement of the sweep, and power is thereby conserved for the remainder of the stroke. The trip lever rollers never come in contact with such link, in fact contact only with the curved toggle arm and the plunger beam.

From the above description it will be apparent that I have produced a baling press possessing the features of advantage enumerated and I wish it to be understood that I do not desire to be restricted to the exact details of construction shown and described as obvious modifications will suggest themselves to one skilled in the art.

Having thus described the invention what I claim as new and desire to secure by Letters-Patent, is:—

1. In a baling press, a suitable framework, a vertical power shaft journaled therein and provided with a trip-lever, a plunger-beam, links pivotally connected together and to the plunger beam and framework respectively, and a toggle comprising an arm pivoted to the framework, and a link pivoted to said arm at one end and pivotally connected to the first-named links at their pivotal point.

2. In a baling press, the combination of a vertical power shaft provided with a trip-lever having a plurality of trip arms, a plunger beam, a pair of links pivotally connected together and to the plunger beam and framework respectively, a curved toggle arm pivoted on the framework and having its convex side toward the plunger beam and in the plane of the trip lever arms, and a link pivotally connecting said lever with the first-named links at their pivotal point of connection.

3. In a baling press, a suitable framework, a vertical power shaft journaled therein and provided with trip lever arms, a plunger beam, a pair of links pivotally connected together and to said beam and the framework respectively, a curved toggle arm pivoted on the framework and having its convex side toward the plunger beam and adapted to be successively engaged by said arms after the recoil of the plunger beam, a toggle link pivotally connected to the free end of the curved arm and having a notch to receive said end and pivotally connected at its opposite end to the first-named pair of links coincidental with their pivotal point of connection.

4. In a baling press, the combination of a suitable framework, a vertical power shaft journaled therein and provided with trip arms, a plunger beam, a link pivoted at its front end to the framework at one side of the power shaft, a link pivotally connected to said link rearward of the power shaft and pivotally connected at its opposite end to the plunger beam, a toggle link pivotally connected to said first-named links at their pivotal point of connection and a curved toggle arm having its free end pivoted to the opposite end of said toggle link and pivotally connected at its opposite end to the framework at its rear end and having its convex side disposed toward the plunger beam.

In testimony whereof I affix my signature, in the presence of two witnesses.

JOSIAH S. TUTTLE.

Witnesses:
  DELLON I. HOOD,
  EVERT A. KEMP.